United States Patent
Blei et al.

(10) Patent No.: US 6,860,605 B2
(45) Date of Patent: Mar. 1, 2005

(54) ARRANGEMENT FOR THE PROJECTION OF A MULTI- COLOURED IMAGE INTO A PROJECTION SURFACE

(75) Inventors: Gertrud Blei, Jena (DE); Gudrun Schroeter, Jena (DE); Dietrich Schmidt, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 10/473,435

(22) PCT Filed: Mar. 26, 2002

(86) PCT No.: PCT/EP02/03385

§ 371 (c)(1),
(2), (4) Date: Sep. 29, 2003

(87) PCT Pub. No.: WO02/080577

PCT Pub. Date: Oct. 10, 2002

(65) Prior Publication Data

US 2004/0090600 A1 May 13, 2004

(30) Foreign Application Priority Data

Mar. 30, 2001 (DE) .......................................... 101 15 847

(51) Int. Cl.$^7$ ........................ G03B 21/00; G03B 21/26; G03B 21/14; G02F 1/1335
(52) U.S. Cl. ............................. 353/31; 353/34; 353/69; 353/102; 353/121; 349/5; 349/7; 349/8
(58) Field of Search ............................. 353/30, 31, 33, 353/34, 37, 69, 81, 82, 102, 121; 349/5, 7, 8

(56) References Cited

U.S. PATENT DOCUMENTS

| 5,179,398 A | 1/1993 | Iizuka .......................... 353/30 |
| 5,264,879 A | 11/1993 | Shikama ....................... 353/31 |
| 6,536,907 B1 * | 3/2003 | Towner et al. ............... 353/121 |

FOREIGN PATENT DOCUMENTS

| EP | 02/03385 | 9/1987 | |
| GB | 2354658 A | 3/2001 | ............ H04N/9/31 |

* cited by examiner

Primary Examiner—Judy Nguyen
Assistant Examiner—Melissa J Koval
(74) Attorney, Agent, or Firm—Patterson, Thuente, Skaar & Christensen, P.A.

(57) ABSTRACT

An arrangement for projecting a multi-color image, including at least two image-generating elements which enable generation of one partial color image each of the multi-color image, and a color combiner which superimposes the light partial beam paths and emits it as a common beam. The arrangement further includes projection optics. The image scales being different for the partial color images, one optical device each is arranged in one or more of the partial beam paths of the partial color images whose image scales differ and each optical device is configured such that, due to the change in the image scale of the corresponding partial color image effected by it, the image scale of the partial color image corresponds to a predetermined, common image scale.

9 Claims, 4 Drawing Sheets

ARRANGEMENT FOR THE PROJECTION OF A MULTI-COLOURED IMAGE INTO A PROJECTION SURFACE

FIELD OF INVENTION

The invention relates to an arrangement for projecting a multi-color image onto a projection surface.

BACKGROUND

Said arrangement comprises at least two image-generating elements which are controllable using a control unit and which enable generation of a partial color image of the multi-color image, and a color combiner arranged following the image-generating elements, wherein the light for the corresponding partial color image coming from the image-generating elements is guided, in one partial beam path each, to the color combiner, which superimposes the light guided in the partial beam paths and emits it as a common beam, said arrangement further comprising projection optics arranged following the color combiner, on which projection optics the common beam impinges and which project the muilticolor image onto the projection surface, and the image scales given by said arrangement being different for two or more partial color images.

In such arrangements for projecting a multi-color image, there is a need to correct the chromatic aberration of magnification of the projection optics (the different image scales), which causes the differently colored components of a pixel, which is to be represented on the projection surface, not to overlie each other. In conventional objective lenses, the chromatic aberration of magnification is corrected by combining optical glasses differing in dispersion (e.g. optical crown/optical flint), and for higher requirements, use may be made of expensive special media having a specific partial dispersion. However, in an arrangement for projecting a multi-color image of the above-mentioned type, correction of the chromatic aberration of magnification is made more difficult, on the one hand, because the color combiner requires a telecentric beam path for the projection light, as the color combiner would otherwise not function sufficiently well, and, on the other hand, because the intercept distance of the projection optics is substantially increased due to the color combiner arranged between the image-generating elements and the projection optics. This leads to more complex and, thus, more expensive projection optics, with the required narrow tolerancing of the dispersion of the employed optical glasses, in particular, leading to a further increased cost.

In view of the above, it is the object of the present invention to improve an arrangement for projection of the aforementioned type in a manner allowing adjustment of the different image scales of the partial color images to each other with minimum effort.

SUMMARY OF THE INVENTION

According to the invention, this object is achieved by an arrangement for projecting a multi-color image onto a projection surface of the aforementioned type in that one optical device each is arranged in one or more of the partial beam paths of the partial color images, whose image scales differ, and each of said optical devices is generated such that, by the change in image scale of the corresponding partial color image effected by it, the image scale of said partial color image corresponds to a predetermined, common image scale.

Thus, according to the invention, by arranging the optical device in a partial beam path or by arranging several optical devices in several partial beam paths, use is made of the fact that the arrangement for projecting a multi-color image comprises several color channels in which one partial color image each is generated. Thus, the corresponding optical device in the partial beam path or color channel (and, thus, before the location where the light of the other color channels is superimposed on the light of this partial beam) allows a desired prior magnification or prior reduction to be effected only for this color channel, independently of the other color channels. Said prior magnification or reduction is chosen such that the desired achromatization is achieved. In cases where one optical device each is arranged in several color channels, the prior magnification or prior reduction, and thus, finally, the magnification or reduction (image scale) of the arrangement according to the invention for each color channel or each partial color image can be defined separately and independently of the other color channels (partial color images). This is always effected in such a way that the image scale of the partial color images corresponds to a predetermined, common image scale, so that the chromatic aberration of magnification or of reduction is considerably reduced or, if possible, completely eliminated.

In a preferred further embodiment of the arrangement according to the invention, the optical device generates a virtual intermediate image of the partial color image generated by the image-generating element of the first partial beam path. The advantage of generating a virtual intermediate image is that it may be generated very near the object (the image-generating element) (for example, between the image-generating element and the optical device), so that there is practically no change in the dimensions of the entire arrangement.

In particular, the optical device in the arrangement according to the invention may comprise at least one lens, which is preferably plano-concave. Using this lens, the optical device can be realized in a simple manner, so that the desired achromatization may be realized by only one lens arranged in the corresponding color channel. This also has the result that the construction of the projection optics is considerably simplified as compared to projection optics wherein achromatization is effected in the projection optics themselves. Of course, the optical device may also comprise several lenses.

A further advantageous embodiment of the arrangement according to the invention consists in that the optical device comprises a material interface of the color combiner located preceding the point of superimposition in the light propagation direction, said material interface being curved (preferably spherical). This has the advantageous effect that no additional optical element is required in order to realize the optical device. It is merely required to provide an existing material interface with a suitable curvature.

In particular, the arrangement according to the invention may be further embodied such that three image-generating elements are provided for the colors green, red and blue, the optical device being arranged in the partial beam path of the image-generating element for the color green. The optical device is preferably adapted to effect a prior reduction. In this case, the achromatization for the colors red and blue may be realized either by correspondingly provided projection optics or by a corresponding optical device in the red and/or blue partial beam path. In this manner, an arrangement is provided with which multi-color images having very good color properties can be displayed on the basis of the primary colors, red, green and blue.

An advantageous embodiment of the arrangement according to the invention consists in that the image-generating elements are provided in the form of LCD modules. These modules enable a very high resolution. They may be provided as transmitting or reflecting modules. If they are provided as reflecting modules, then the color combiner is advantageously also employed as color splitter, in particular, for white illumination light. Further, it is also possible to realize the image-generating elements by tilting mirror matrices including a plurality of tilting mirrors arranged in lines and columns, which may be brought into at least two different tilting positions. In this case, too, the color combiner is preferably also employed as a color splitter for the illumination light.

The arrangement according to the invention can project the multi-color image generated by the image-generating elements in magnified, reduced or unmagnified form (the image scale then being 1).

BRIEF DESCRIPTION OF THE DRAWING

The invention is explained in more detail below, essentially by way of example, with reference to the drawings, wherein.

DETAILED DESCRIPTION OF THE INVENTION

Figure 1:
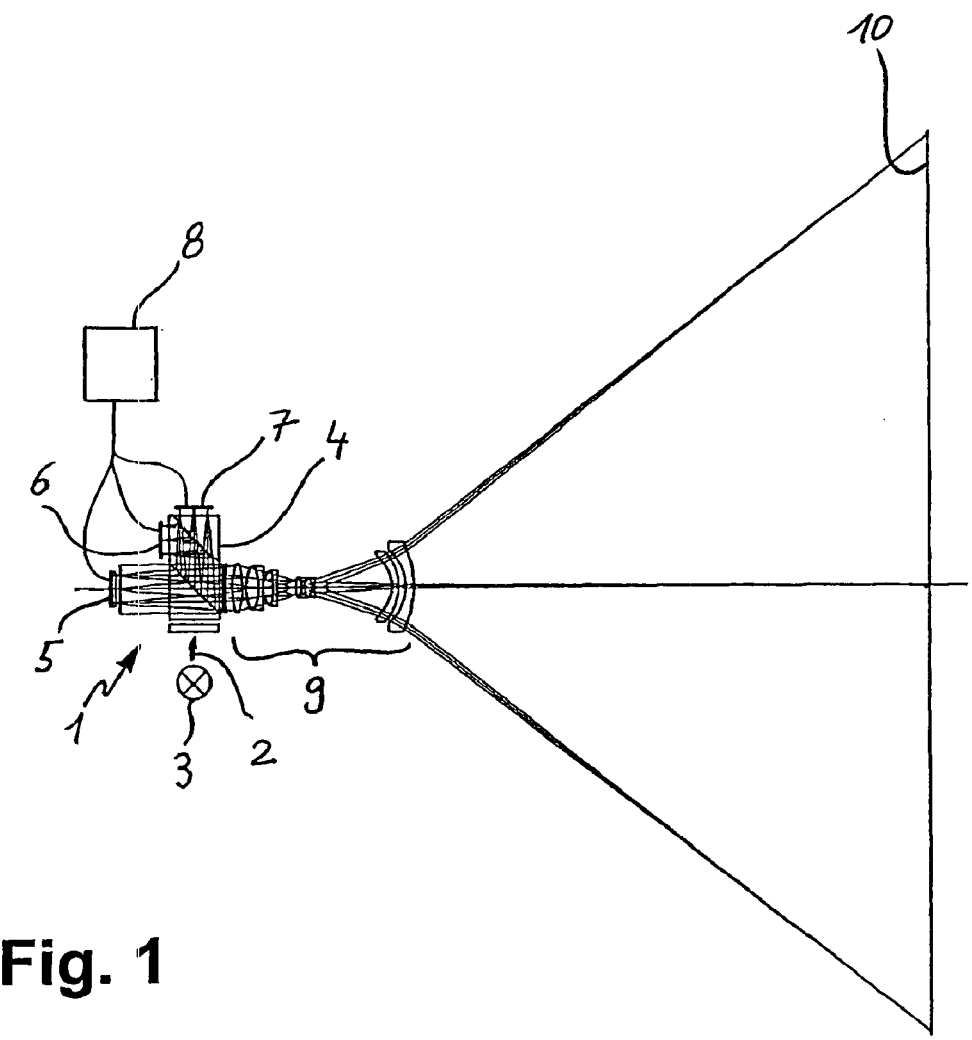
FIG. 1 shows a view of the arrangement for projecting a multi-color image according to the invention.

The arrangement for projecting a multi-color image comprises an image-generating portion 1, on which white light 2 from a light source 3 may be incident, and a color unit 4, which is employed both as a color splitter and as a color combiner, as will be described in more detail hereinafter.

The color unit 4 splits the white light 2, which is incident thereon, up into the colors red, green and blue, and guides the light of each of these colors to an image-generating element 5, 6 and 7 which, in the embodiment example presently shown, is a reflecting LCD module in each case. These LCD modules 5 to 7 comprise individually controllable image pixels, which are arranged in a matrix of lines and columns and are controlled by a control unit 8. Each image pixel may be switched to at least a first condition, wherein the polarization direction of the reflected light is not rotated, and to a second condition, wherein the polarization direction of the reflected light is rotated, preferably through 90°, so that the light reflected by the LCD modules 5 to 7 is polarization-modulated. The reflected light is superimposed to form a common beam by the color unit 4 and is projected, by projection optics 9 arranged following the color unit 4, onto a projection surface 10 so as to represent the multi-color image on the latter.

Figure 2:
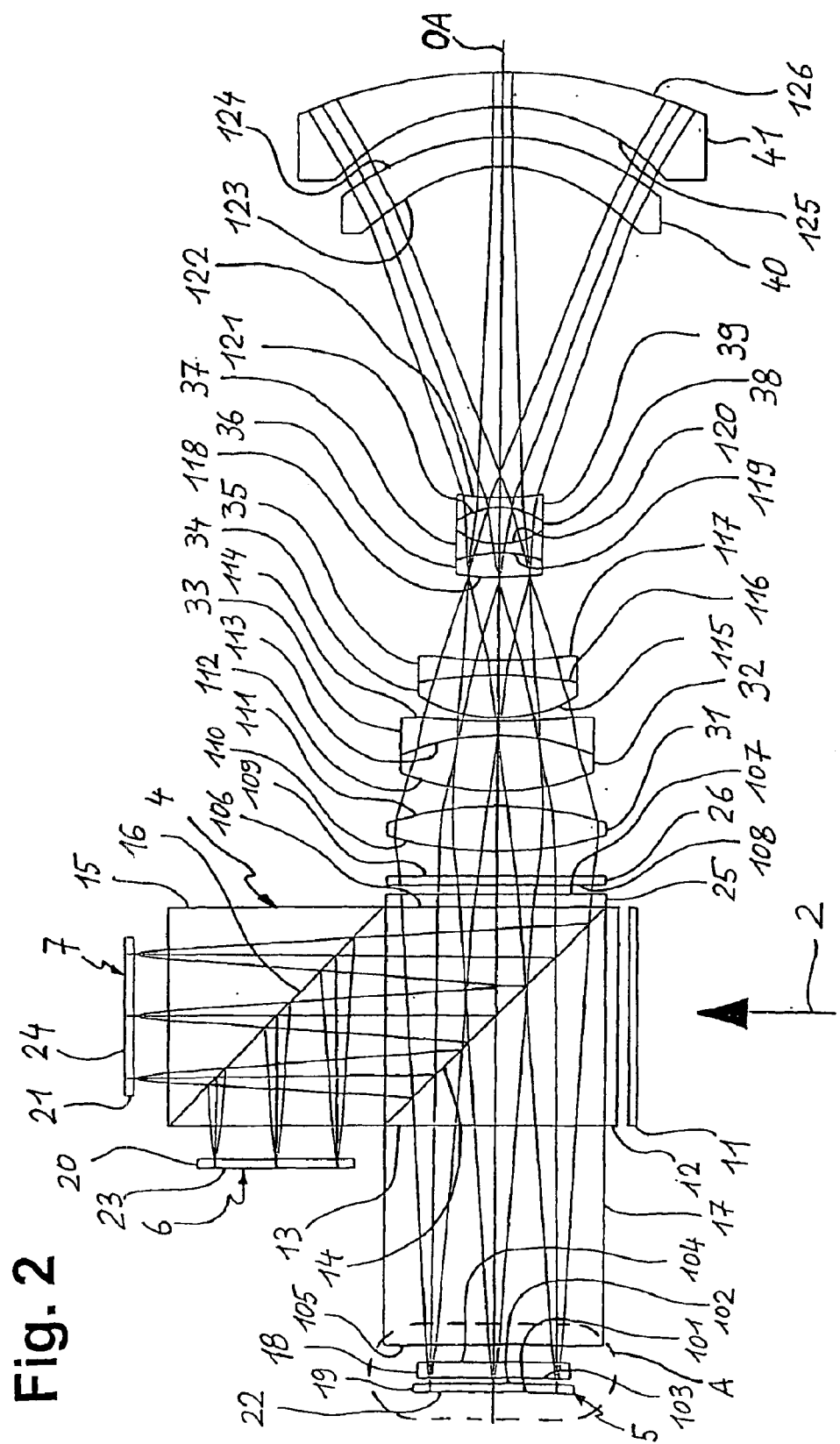
FIG. 2 shows an enlarged view of the color unit and of the projection optics of the arrangement shown in FIG. 1.

FIG. 2 shows the color unit 4 and the projection optics 9 in an enlarged view, and for better comprehension of the function of these elements, projection beam paths are indicated. The white illumination light 2 first impinges on a polarizer 11, which only allows light to pass which is polarized perpendicular to the drawing plane, which light then impinges on a retarder 12 arranged following the polarizer 11, which passes through the light incident thereon and is adapted to rotate only the polarization direction of the green light through 90°, but does not change the polarization direction of the remaining light. The green light, which is now polarized in parallel with the drawing plane, and the remaining light (red and blue light), which is polarized perpendicular to the drawing plane, subsequently reaches a polarization splitter cube 13 containing a polarization splitter layer 14, which is inclined at 45° relative to the propagation direction of the white light 2. The light polarized in parallel with the drawing plane (i.e. the green light) is reflected by this polarization splitter layer 14, and the light polarized perpendicular to the drawing plane is allowed to pass, so that the green light is deflected to the left, as viewed in FIG. 2, while the red and blue light passes through the polarization splitter layer 14 and is upwardly propagated.

By a color-splitting layer 16 (dichroic layer) in a color-splitting cube 15 arranged following the polarization splitter cube 13, the color-splitting layer 16 being aligned in parallel with the polarization splitter layer 14, said red and blue light is then split up into the red and blue color components, such that the blue light is reflected and, thus, deflected to the left, as viewed in FIG. 2, as well as directed to the LCD module 6, and that the red light passes through the color-splitting layer 16 and impinges on the LCD module 7.

The green light, which is reflected to the left, as viewed in FIG. 2, by the polarization splitter layer 14, is guided through a glass block 17, which is subsequently arranged in this direction and is provided to adapt the path in glass for the green light to the paths in glass for the red and blue light, and is then directed to the LCD module 5 by the field lens 18. Said field lens 18 is provided to compensate for the chromatic aberration of magnification of the arrangement for projecting a multi-color image, in particular of the projection optics, of the color green relative to the colors red and blue. The exact function of the field lens 18 will be explained in further detail with reference to FIG. 3.

Each of the LCD modules 5 to 7 comprises a cover glass 19, 20, 21 and, behind it, the image-generating area 22, 23, 24, which is now schematically represented in the Figures by a line.

In operation, the LCD modules 5 to 7 are controlled by the control unit 8 such that those image pixels which are to be brightened rotate the polarization direction of the light reflected by them through 90°, while the remaining image pixels, which are to be darkened, do not rotate the polarization direction of the light reflected by them, so that a green, a blue and a red partial color image of the multi-color image to be projected are generated by the LCD modules 5, 6 and 7 (for adjustment of the brightness of the individual image pixels, the time period during which they are brightened, may be correspondingly selected). Said partial color images are superimposed in a common light beam by the color-splitting layer 16 and the polarization beam-splitting layer 14, with the reflected green light, whose polarization direction is not rotated (light polarized in parallel with the drawing plane), being downwardly reflected, as viewed in FIG. 2, by the polarization beam-splitting layer 14, while the light polarized perpendicular to the drawing plane passes through the polarization beam-splitting layer 14. The same applies to the red and blue light, in which case the reflected light which is polarized perpendicular to the drawing plane passes through the polarization beam-splitting layer 14, while the reflected light polarized in parallel with the drawing plane is reflected to the right, as viewed in FIG. 2, by the polarization beam-splitting layer 14.

This common beam formed by the polarization beam-splitting layer 14 then impinges on a retarder 25, which only rotates the polarization direction of the green light through 90° and does not influence the polarization direction of the remaining light (the red and blue light), so that, following the retarder 25, the red, green and blue light is, respectively, polarized in parallel with the drawing plane. Said light then impinges on an analyzer 26, which only allows light to pass which is polarized in parallel with the drawing plane. The retarder 25 and the analyzer 26 serve to increase contrast, since the polarization beam-splitting layer 14 undesirably also allows light to pass, which is polarized in parallel with the drawing plane (i.e. actually darkened pixels), due to the different angles at which the green light reflected by the LCD module 5 impinges on the polarization beam-splitting layer 14. However, the retarder 25 and the analyzer 26 fade out the majority of said light. The same applies to the reflected red and blue light, which is polarized perpendicular to the drawing plane and should actually not be reflected by the polarization beam-splitting layer 14 in the direction of the projection objective 9.

The retarders 12, 25, the polarizers 11, 26, the polarization beam-splitter cube 13 comprising the polarization beam-splitter layer 14, and the color-splitting cube 15 comprising the color-splitting layer 16, are selected by the skilled person on the basis of their technical knowledge.

The analyzer is followed by the projection optics 9, which, on the basis of the color unit 4, jointly project the partial color images generated by the LCD modulators 5 to 7 onto the projection surface 10 as the desired multi-color image.

The projection optics 9 are designed such that they are achromatized for the red and blue partial color images, so that the red and blue color components of a pixel are superimposed on one another on the projection surface 10.

In order to also achromatize the green partial color image relative to the red and green partial color images, the field lens 18 is provided, whose shape is selected such and which is arranged in the color partial beam path (i.e. the beam path of the green light before being superimposed by the color unit 4) such that the green partial color image is subjected to a slight prior reduction. Together with the magnification of the projection objective 9, this will then lead to an achromatization also of the green partial color image.

Figure 3:
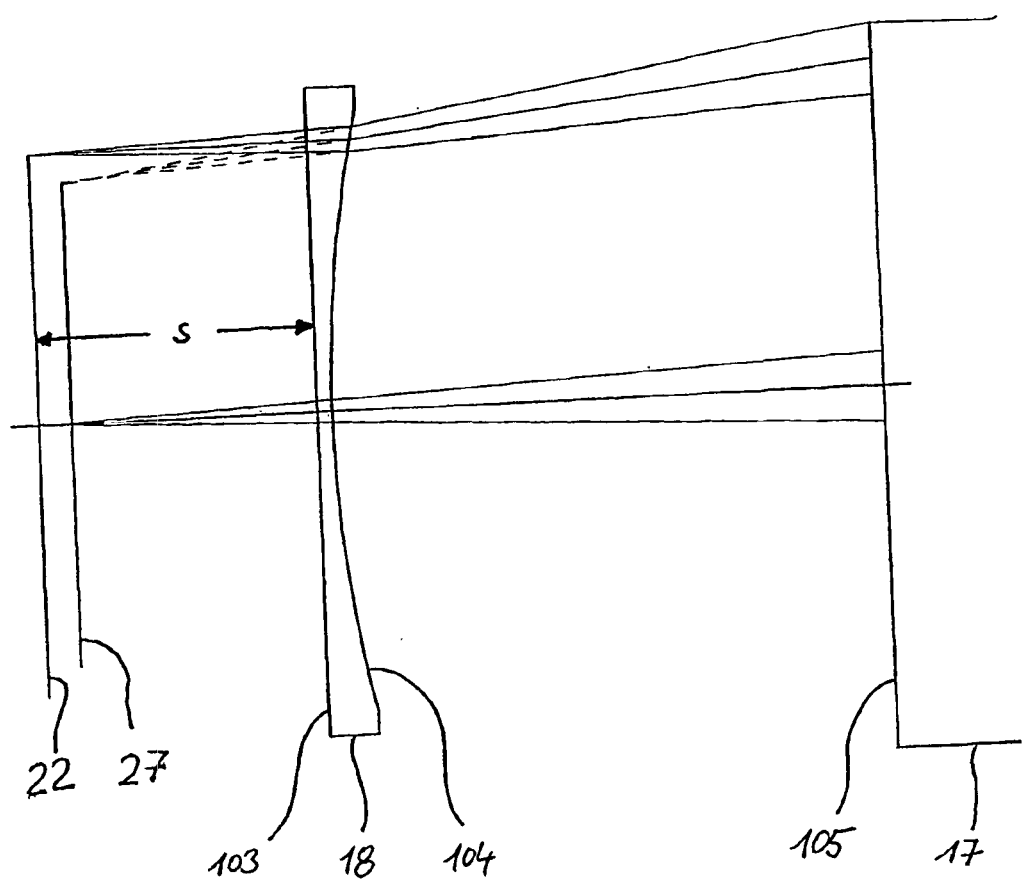
FIG. 3 shows an enlarged view of the detail A of FIG. 2.
Figure 4:
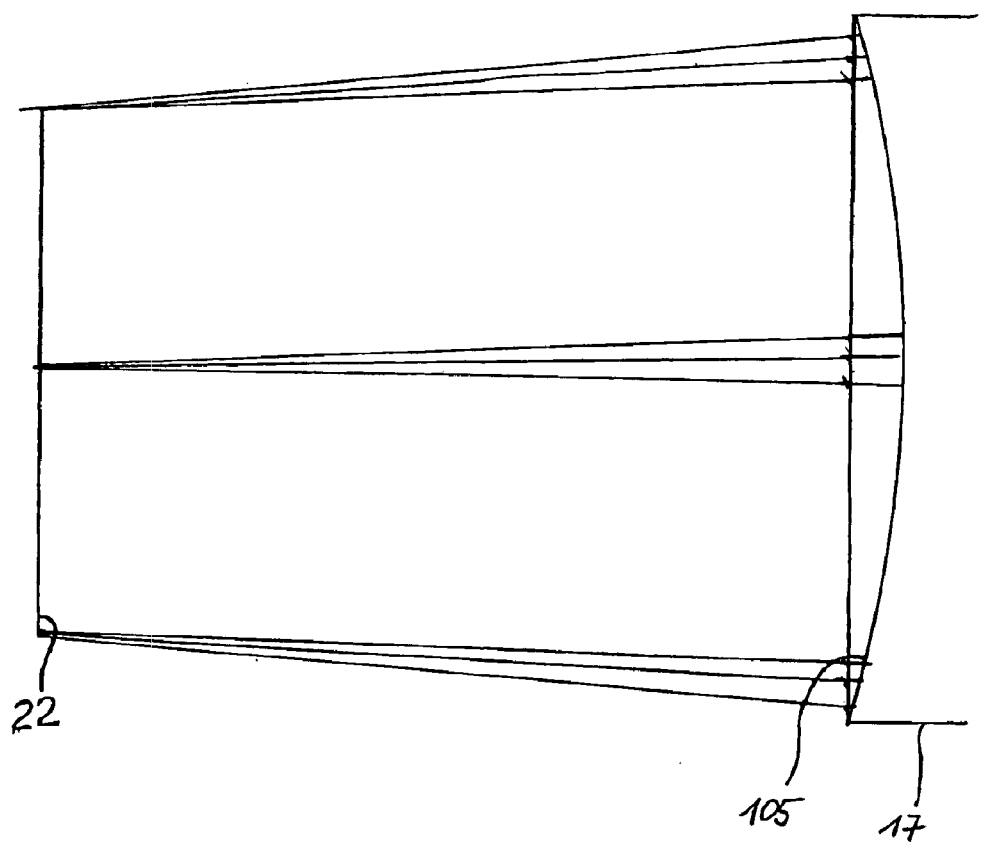
FIG. 4 shows an enlarged view of the detail A of FIG. 2 for another embodiment of the invention.

FIG. 3 schematically shows the prior reduction by the field lens 18, said representation not being to scale and the cover glass 19 of the LCD module 5 not being shown. The field lens 18 is a plano-concave lens which forms a virtual intermediate image 27 of the image-generating area 22 of the LCD module 5, which area is located between the field lens 18 and the LCD module, said virtual intermediate image 27 being smaller than the image-generating area 22 of the LCD module 5. In the presently described case, the chromatic aberration of magnification for the green light is 1‰, so that, in order to correct it, the distance s of the field lens 18 from the image-generating area 22 was selected to be 2.3 mm for a focal length f=−3248. Therefore, the intermediate image 27 is located nearly in the plane of the image-generating area 22.

The exact configuration of the optical system shown in FIG. 2 is evident from the following Tables, wherein the radiuses of curvature are indicated without algebraic signs, since FIG. 2 shows whether the corresponding surface is convex or concave:

TABLE 1

| Surface number | Radius of curvature (mm) | Surfaces | Distance between vertexes (mm) |
|---|---|---|---|
| 101 | ∞ | 101–102 | 1.4 |
| 102 | ∞ | 102–103 | 0.9 |
| 103 | ∞ | 103–104 | 2.5 |
| 104 | 1700.0 | 104–105 | 2.7 |
| 105 | ∞ | 105–106 | 69.5 |
| 106 | ∞ | 106–107 | 2.2 |
| 107 | ∞ | 107–108 | 1.5 |
| 108 | ∞ | 108–109 | 1.4 |
| 109 | ∞ | 109–110 | 3.9 |
| 110 | 57.3 | 110–111 | 7.5 |
| 111 | 57.3 | 111–112 | 2.2 |
| 112 | 40.1 | 112–113 | 9.0 |
| 113 | 40.1 | 113–114 | 2.5 |
| 114 | 144.3 | 114–115 | 0.5 |
| 115 | 23.1 | 115–116 | 6.8 |
| 116 | 63.9 | 116–117 | 2.5 |
| 117 | 63.9 | 117–118 | 13.5 |
| 118 | 54.0 | 118–119 | 4.0 |
| 119 | 18.3 | 119–120 | 1.5 |
| 120 | 11.2 | 120–121 | 5.8 |
| 121 | 11.2 | 121–122 | 1.5 |
| 122 | 42.3 | 122–123 | 53.1 |
| 123 | 21.7 | 123–124 | 4.5 |
| 124 | 37.2 | 124–125 | 4.9 |
| 125 | 34.6 | 125–126 | 5.5 |
| 126 | 76.6 | 126–10 | 358.8 |

TABLE 2

| Number of the optical element | Refractive index | Abbe dispersion number | Diameter (mm) |
| --- | --- | --- | --- |
| 19 | 1.519 | 63.96 | 22 |
| 18 | 1.519 | 63.96 | 22 |
| 17 + 13 | 1.855 | 23.64 | |
| 25 | 1.519 | 63.96 | 31 |
| 26 | 1.519 | 63.96 | 31 |
| 31 | 1.621 | 49.54 | 33 |
| 32 | 1.489 | 70.23 | 29 |
| 33 | 1.813 | 25.16 | 29 |
| 34 | 1.489 | 70.23 | 23 |
| 35 | 1.813 | 25.16 | 23 |
| 36 | 1.813 | 25.16 | 10 |
| 37 | 1.610 | 56.37 | 11 |
| 38 | 1.624 | 36.11 | 11 |
| 39 | 1.839 | 42.48 | 12 |
| 40 | 1.527 | 56.26 | 48 |
| 41 | 1.776 | 49.38 | 62 |

The lens surface indicated by reference numeral 123 is aspherically ground, with the aspheric parameter being indicated in the ISO nomenclature in Table 3. The aspheric equation according to ISO is as follows.

$$z = \frac{h^2}{\mathrm{rad}} \frac{1}{1 + \sqrt{1 - (1+k)\frac{h^2}{\mathrm{rad}^2}}} + \sum_{i=2}^{5} c(i) h^{2i}$$

wherein h is the distance to the optical axis OA and z is the distance to the vertex plane (the plane which is perpendicular to the optical axis OA and contains the point of intersection of the vertex of the surface comprising the optical axis OA).

TABLE 3

| rad | k | c(2) | c(3) | c(4) | c(5) |
| --- | --- | --- | --- | --- | --- |
| 21.70000 | $-9.59292 \cdot 10^{-1}$ | $5.3713940 \cdot 10^{-7}$ | $-7.238548 \cdot 10^{-9}$ | $1.4979671 \cdot 10^{-11}$ | $-1.630338 \cdot 10^{-14}$ |

In an alternative embodiment (not shown), the surface 105 of the glass block 17 may have a curved design, instead of the field lens 18, and assume the function of the field lens 18, so that there is, advantageously, no need to provide an additional lens.

What is claimed is:

1. A multicolor projector, comprising:

projection optics;

a first image generating element generating a first partial image in a first color;

a second image generating element generating a second partial image in a second color;

a color combiner following the first and second image generating elements to combine the first and second partial images;

the first and second partial images being affected by lateral chromatic aberration and having different image sizes; and at least one optical device in a beam path altering the size of at least one of the first and second partial images to substantially conform the different image sizes to a single image size.

2. The multicolor projector as claimed in claim 1, in which the optical device comprises an optical element selected from a group consisting of a lens and a curved surface of the color combiner.

3. The multicolor projector as claimed in claim 1, further comprising a third image generating element generating a third partial image in third color and in which the image sizes of the first and second partial images are conformed to the single image size by the optical device and the image size of the third partial image is conformed to the single image size by the projection optics.

4. The multicolor projector as claimed in claim 3, in which the first, second and third image generating elements comprise LCD modules.

5. The multicolor projector as claimed in claim 3, in which the first, second and third image generating elements are colored red, green and blue.

6. A method of compensating for lateral chromatic aberration in a projector comprising the steps of:

generating a first partial image having a first color and a second partial image having a second color, the first and second images having different image sizes as a result of lateral chromatic aberration;

optically altering at least one of different image sizes to conform the different image sizes to a single image size;

combining the first and second partial images; and projecting the combined image.

7. The method as claimed in claim 6, further comprising the steps of generating a third partial image having a third color; and optically altering a size of the third partial image to conform it to the single image size.

8. The method as claimed in claim 7, further comprising the steps of optically altering at least one of the different image sizes via an optical device comprising an optical element selected from a group consisting of a lens and a curved surface of a color combiner.

9. The method as claimed in claim 7, further comprising the steps of generating the first, second and third partial images with LCD modules and in which the first color is red, the second color is blue and the color is green.

* * * * *